US008169442B2

(12) United States Patent
Falchetto (10) Patent No.: US 8,169,442 B2
(45) Date of Patent: May 1, 2012

(54) GRAPHIC SYSTEM COMPRISING A FRAGMENT GRAPHIC MODULE AND RELATIVE RENDERING METHOD

(75) Inventor: Mirko Falchetto, Milzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1159 days.

(21) Appl. No.: 11/965,498

(22) Filed: Dec. 27, 2007

(65) Prior Publication Data
US 2009/0167772 A1    Jul. 2, 2009

(51) Int. Cl.
*G06T 1/20*    (2006.01)
(52) U.S. Cl. ............................ 345/506; 345/421; 345/422
(58) Field of Classification Search .................. 382/173; 345/506
See application file for complete search history.

(56) References Cited

U.S. PATENT DOCUMENTS

| | | | |
|---|---|---|---|
| 6,898,692 B1 * | 5/2005 | Cameron et al. .................. 712/22 |
| 6,999,076 B2 * | 2/2006 | Morein ........................... 345/422 |
| 7,450,123 B1 * | 11/2008 | Kilgard .......................... 345/426 |
| 2004/0246260 A1 * | 12/2004 | Kim et al. ....................... 345/557 |
| 2005/0195198 A1 * | 9/2005 | Anderson et al. ............. 345/506 |
| 2006/0098021 A1 * | 5/2006 | Rim et al. ....................... 345/543 |
| 2006/0209078 A1 * | 9/2006 | Anderson et al. ............. 345/506 |
| 2007/0103462 A1 * | 5/2007 | Miller ............................ 345/421 |
| 2007/0237038 A1 * | 10/2007 | Li et al. ........................ 369/13.35 |
| 2008/0007563 A1 * | 1/2008 | Aronson et al. ............... 345/589 |
| 2008/0118148 A1 * | 5/2008 | Jiao et al. ....................... 382/173 |
| 2008/0198168 A1 * | 8/2008 | Jiao et al. ....................... 345/506 |

* cited by examiner

*Primary Examiner* — Xiao M. Wu
*Assistant Examiner* — Phi Hoang
(74) *Attorney, Agent, or Firm* — Seed IP Law Group PLLC (57) ABSTRACT

A graphic system having a central processing unit; a system memory coupled to the central processing unit; a display unit provided with a corresponding screen; a graphic module coupled to and controlled by the central processing unit to render an image on the screen of the display unit, the graphic module including a fragment graphic module having a depth test buffer for storing a current depth value; a depth test stage coupled to the depth test buffer for comparing the current depth value with a depth coordinate associated with an incoming fragment and defining a resulting fragment; a test stage for testing the resulting fragment and defining a retained fragment; a buffer writing stage operatively associated with the test stage for receiving the retained fragment, the buffer writing stage coupled to the depth test buffer for updating the current depth value with a depth value of the retained fragment.

21 Claims, 7 Drawing Sheets

GRAPHIC SYSTEM COMPRISING A FRAGMENT GRAPHIC MODULE AND RELATIVE RENDERING METHOD

BACKGROUND

1. Technical Field

The present disclosure relates to a 3D (three-dimensional) graphic pipeline module and, more particularly, to a system having a fragment pipeline graphic module.

2. Description of the Related Art

Computer graphics is the technique of generating images or pictures in discernable form, such as on a display device or printer, with a computer. The generation of pictures or images is commonly called rendering. Generally, in three-dimensional computer graphics, geometry that represents surfaces (or volumes) of objects in a scene is translated into pixels and then displayed on the display device.

In computer graphics, each object to be rendered is composed of a number of primitives. A primitive is a simple geometric entity such as, e.g., a point, a line, a triangle, a square, a polygon, or high-order surface. A single primitive is also defined by a set of attributes that belongs to the primitive (e.g., colors, texture coordinates, and user-defined properties) and that are associated in a proper way to all the pixels of the screen. This information is included in a so-called fragment so that every pixel to be displayed on the screen can be rightly colored on the display according to the fragment attributes set at a certain pixel onto the screen.

The processing of a fragment is performed by a sub-graphic pipeline of a typical graphic pipeline called fragment graphic pipeline.

The OpenGL ES Standard imposes certain constraints on the order of the operative modules of a fragment graphic pipeline.

It is observed that the order of the operative module of the fragment graphic pipeline often implies processing of a fragment by expensive operation modules, even if the same fragment at the end of the fragment graphic pipeline processing is discarded because it does not have a displayable fragment on the screen.

Since bandwidth dedicated to expensive operative modules is usually limited, it has been noticed that there is a need for a fragment graphic pipeline that reduces unnecessary use of the bandwidth during processing of a fragment in the fragment graphic pipeline.

BRIEF SUMMARY

In accordance with a particular embodiment of the present disclosure, a graphic system is provided that includes a central processing unit; a display unit having a corresponding screen; and a graphic module coupled to and controlled by the central processing unit to render an image on a screen of the display unit. Particularly, the graphic module includes a fragment graphic module having a depth test buffer for storing a current depth value; a depth test stage coupled to the depth test buffer for comparing the current depth value with a depth coordinate associated with an incoming fragment and defining a resulting fragment; a test stage for testing the resulting fragment and defining a retained fragment; a buffer writing stage operatively associated with the test stage for receiving the retained fragment, the buffer writing stage coupled to the depth test buffer for updating the current depth value with a depth value of the retained fragment.

According to another embodiment, the fragment graphic module includes a depth test buffer for storing a current depth value; a depth test stage coupled to the depth test buffer for comparing the current depth value with a depth coordinate associated with an incoming fragment and defining a resulting fragment; a test stage for testing the resulting fragment and defining a retained fragment; and a buffer writing stage operatively associated with the test stage for receiving the retained fragment. The buffer writing stage is coupled to the depth test buffer for updating the current depth value with a depth value of the retained fragment.

In accordance with another particular embodiment, a method for rendering an image on a screen of a display unit of a graphic system having a graphic module coupled to and controlled by a central processing unit is provided. The method includes storing a current depth value associated to a current fragment in a depth test buffer; performing a depth test by comparing the current depth value with a depth value associated with an incoming fragment and defining a resulting fragment; testing the resulting fragment to define a retained fragment; and updating the current depth value with a depth value of the retained fragment.

In accordance with another embodiment of the present disclosure, a fragment graphic pipeline for processing incoming fragments having attributes associated with pixels of an image to be rendered on a display screen is provided. The pipeline includes a depth/stencil test stage adapted to compare a depth value of the incoming fragment with a depth value stored in a depth test buffer, the depth/stencil test stage adapted to further compare planar coordinates in the incoming fragment with test planar coordinates stored in a stencil buffer that define the active area on the display screen to determine if the incoming fragment is included in the active area of the display screen; at least a first texturing/blending stage and a last texturing/blending stage coupled to the depth/stencil stage and adapted to apply color attributes to the incoming fragment; an alpha test stage coupled to the last texturing/blending stage and adapted to compare a transparency level of the incoming fragment and a reference transparency and to forward down the pipeline the incoming fragment that passes the alpha test stage comparison of the transparency level; and a buffer writing stage coupled to the alpha test stage to receive the incoming fragment that passes the alpha test stage and adapted to update the depth test buffer to replace the current depth value with a depth value of the incoming fragment that passes the alpha test stage.

In accordance with another aspect of the foregoing embodiment, the pipeline includes a scissor test stage ahead of the depth/stencil test stage in the pipeline and adapted to delimit an active portion of the display screen when rendering an image in that portion of the display screen.

In accordance with another aspect of the foregoing embodiment, the scissor test stage is adapted to generate only incoming fragments that are included in the active portion of the display screen defined by planar coordinates of a bottom-left corner and an upper-right corner of the active area.

In accordance with another aspect of the foregoing embodiment, the buffer writing stage is further adapted to update the stencil test buffer.

In accordance with another aspect of the foregoing embodiment, the pipeline comprises the depth/stencil test stage is configured to perform the depth test by only reading the depth test buffer while the buffer stage is adapted to only update the depth test buffer.

In accordance with another aspect of the foregoing embodiment, the pipeline comprises a color buffer write stage operatively associated with the buffer writing stage and adapted to generate pixel information from the incoming fragment that has been processed through the pipeline.

In accordance with another aspect of the foregoing embodiment, the pipeline includes at least one additional texturing/blending stage coupled between the buffer writing stage and the color buffer write stage.

In accordance with another aspect of the foregoing embodiment, the pipeline includes an additional depth/stencil test stage coupled between the alpha test stage and the buffer writing stage and adapted to perform depth and stencil testing of the incoming fragment and to update the depth test buffer and the stencil test buffer.

In accordance with another aspect of the foregoing embodiment, the pipeline includes an enabling/disabling stage coupled to an input of the depth/stencil test stage and adapted to introduce a processing delay to provide time for reading of the depth test buffer by the depth/stencil test stage before writing to the depth test buffer by the buffer writing stage.

BRIEF DESCRIPTION OF THE SEVERAL VIEWS OF THE DRAWINGS

These and other aspects of the disclosure will be apparent upon reference to the attached figures and following detailed description, where.

DETAILED DESCRIPTIONS

Figure 1:
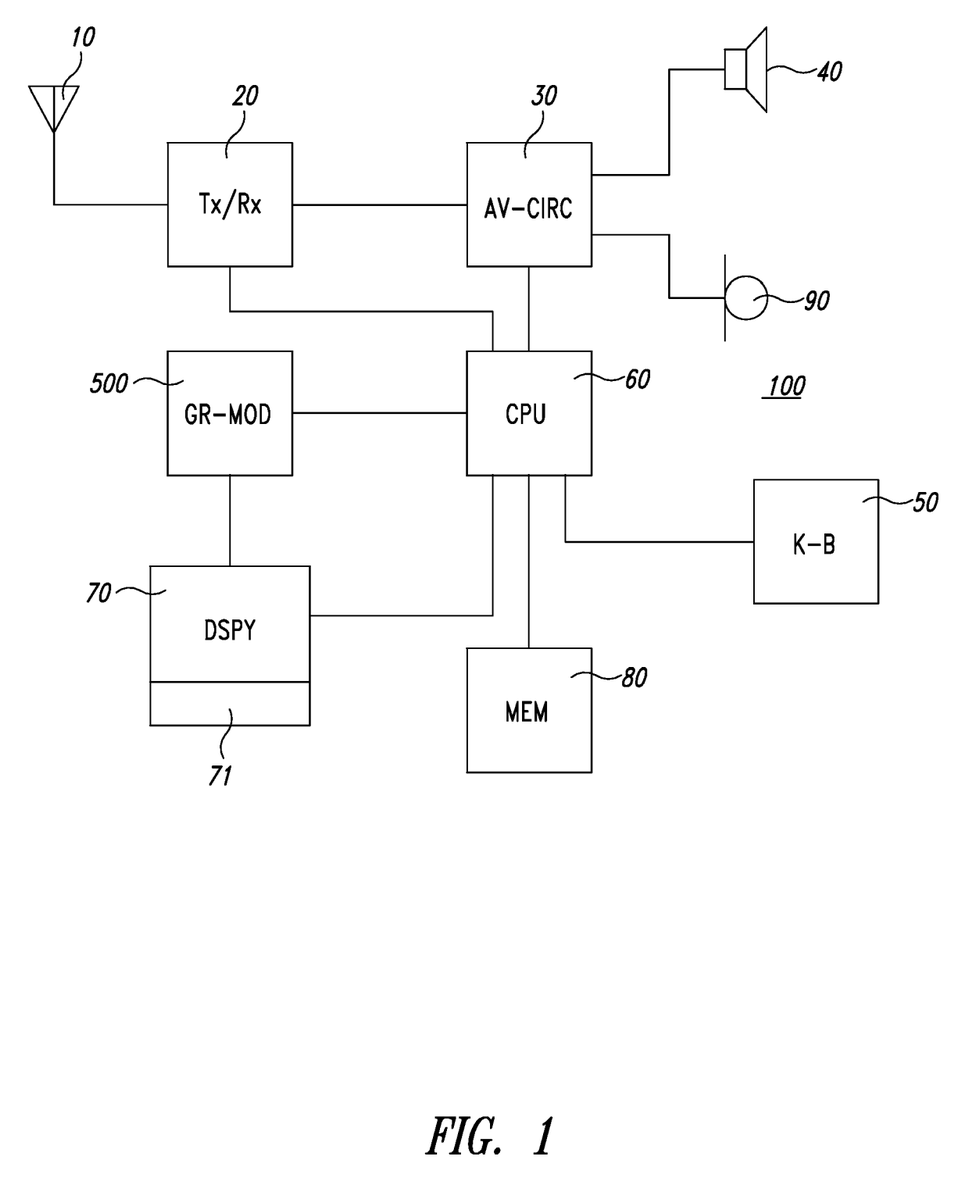
FIG. 1 shows a graphic system in accordance with an embodiment of the disclosure.

FIG. 1 shows a graphic system 100 according to an embodiment of the disclosure, including a graphic rendering module 500. The graphic system 100 illustrated in FIG. 1 is a mobile phone, but in accordance with further embodiments of the disclosure, graphic system 100 can be another system, such as a personal digital assistant (PDA), multimedia devices with a screen of the VGA type (terrestrial digital receiver, DVIX reader, MP3 reader), a computer (e.g., a personal computer), a game console (PS3), a set top box (STB), etc.

As an example, the mobile phone 100 can be a cellular phone provided with an antenna 10, a transceiver 20 (Tx/Rx) connected to the antenna 10, and an audio circuit 30 (AV-CIRC) connected with the transceiver 20. A speaker 40 and a microphone 90 are connected to the audio circuit unit 30.

The mobile phone 100 is further provided with a CPU (central processing unit) 60 for controlling various functions and, particularly, the operation of the transceiver 20 and the audio circuit unit 30 according to a control program stored in a system memory 80 (MEM), connected to the CPU 60. Graphic module 500 is connected to and controlled by the CPU 60. Moreover, mobile phone 100 is provided with a display unit 70 having a corresponding screen 71 (e.g., a liquid crystal display, DSPY), and a user interface 50, such as an alphanumeric keyboard (K-B).

The graphic module 500 is configured to perform a set of graphic functions to render an image on a screen 71 of the display 70. Preferably, the graphic module 500 is a graphic engine configured to rendering images, offloading performing of the task from the CPU 60. As used herein, the term "graphic engine" means a device that performs rendering in hardware or software not running on a CPU, but on another coprocessor such as a DSP (digital signal processor). The term "graphic accelerator" or "graphic coprocessor", are also employed in the field, are equivalent to the term "graphic engine."

Alternatively, the graphic module 500 can be a graphic processing unit (GPU) wherein the rendering functions are performed on the basis of hardware and software instructions executed on a dedicated processor such as a DSP. In accordance with a further embodiment, some or all the rendering functions are performed by the CPU 60.

Figure 2:
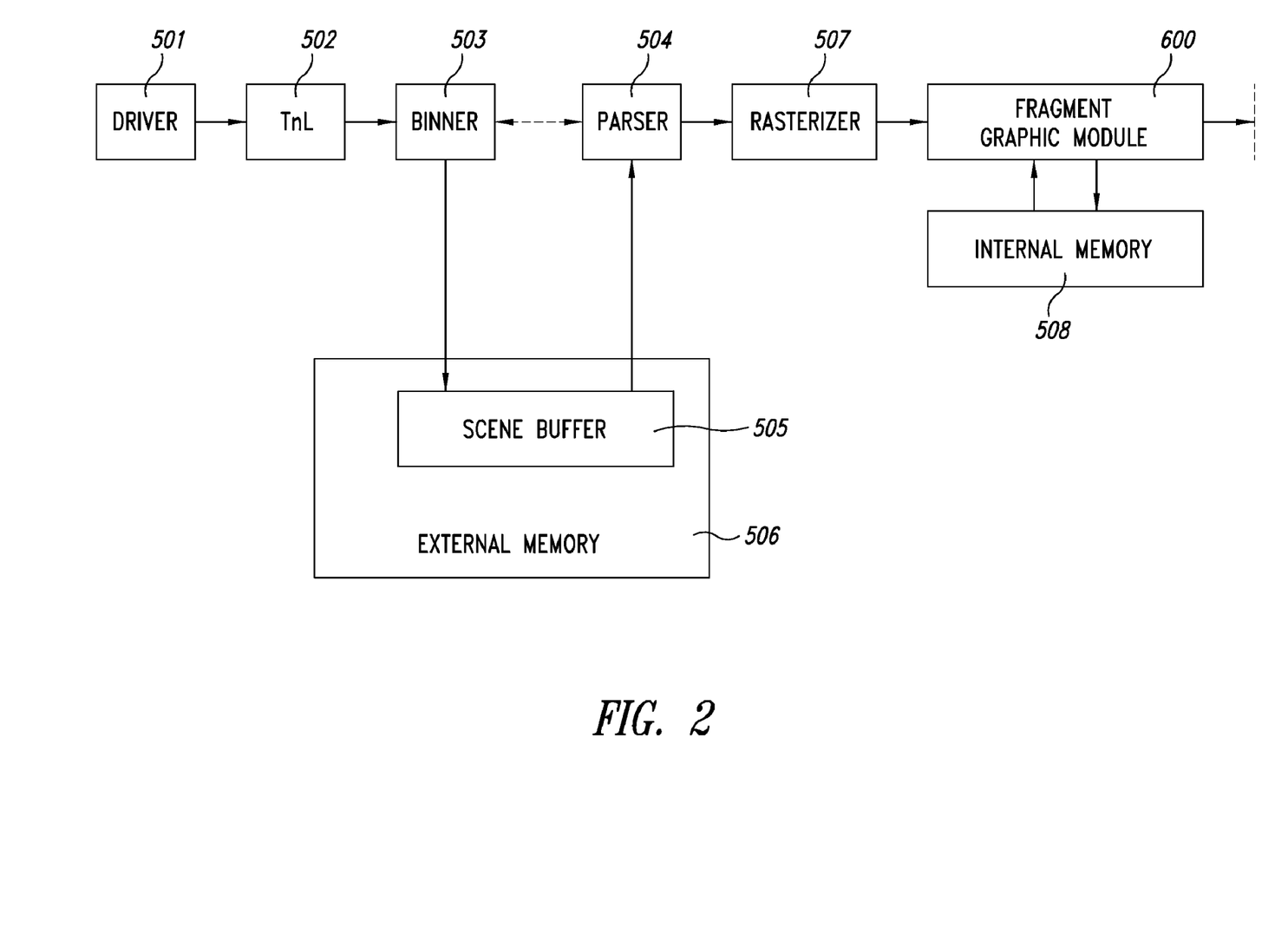
FIG. 2 shows an example of graphic module in accordance with a particular embodiment of the disclosure.

FIG. 2 is a block diagram of the graphic module 500. Graphic engine 500 can perform the rendering of 3D (three-dimensional) scenes that are displayed on the screen 71 of the display 70. Particularly, the graphic engine 500 can be operated according to a sort-middle rendering approach (also called "tile based" rendering).

In accordance with the sort-middle rendering, the screen 71 of the display 70 is divided in a plurality of 2D (two-dimensional) ordered portions (i.e., 2D tiles) such as, for example, square tiles. As an example, the screen is partitioned into 2D files having size 16×16 pixels or 64×64 pixels.

The graphic engine 500 illustrated in FIG. 2 includes a driver 501, a geometry stage 502 (also known as TnL stage—Transform and Lighting stage), a binner stage 503, a parser stage 504, a rasterizer stage 507, and a fragment graphic module 600 that is coupled to the display 70 (not shown in FIG. 2) of the mobile phone of FIG. 1.

The driver 501 is a block having interface tasks and is configured to accept commands from programs (e.g., application programming interface API) running on the CPU 60 and then translate them into specialized commands for the other blocks of the graphic engine 500.

The graphic engine 500 is configured to process primitives and apply transformations (into the geometry stage 502) to them so as to move 3D objects. As defined above, a primitive is a simple geometric entity such as, e.g., a point, a line, a triangle, a square, a polygon or high-order surface. Reference is often made to triangles, which can be univocally defined by the coordinates of their vertexes, without other types of employable primitives.

The binner stage 503 is adapted to acquire from the geometry stage 502 primitives coordinates and associate them with each tile of the screen 71. The binner stage 503 is coupled to a scene buffer 505 which is a memory able to store information relating primitive data provided by the binner stage 503. Preferably, the scene buffer 505 is external to the graphic module 500 and particularly is allocated in an external memory 506. As an example, the external memory 506 can be the system memory 80 of the graphic system 100 illustrated in FIG. 1.

The parser stage 504 is coupled to the scene memory 505 and is responsible for reading, for each tile, the information in the scene buffer 505 and passing such information to the rasterizer stage (507). The parser stage 504 is coupled to the binner stage 503 to receive synchronization signals.

The rasterizer stage 507 is located between the parser stage 504 and the fragment graphic module 600 and is configured to receive and process primitive data from the parser stage 504 so as to generate a fragment completely inside a current tile under processing to be processed by the fragment graphic module 600.

As defined, a fragment is a set of pixel information referred to the same primitive so that a correct color of a pixel to be written in the scene memory 504 is produced by the fragment graphic module 600.

The set of pixel information included in a fragment comprise attribute values of each pixel such as data relating to color, planar position coordinates x and y, depth position coordinate z, texture coordinates, alpha value, stencil value, etc. As an example, a triangle vertex has the following attributes: color, position, and coordinates associated with texture. As known to the skilled person, a texture is an image (e.g., a bitmap image) that could be mapped on the primitive. As defined, a pixel is a two-dimensional memory location in which color information relating red (R), green (G), blue (B) and transparency values (A) can be stored.

The graphic module 500 of FIG. 2 further comprises an internal graphic memory 508 coupled to the fragment graphic module 600, which is a memory able to store information provided by the fragment graphic module 600. As explained below, the fragment graphic module 600 is arranged to read from and to write in the internal memory 508 information relating to a fragment under processing received from the rasterizer stage 507.

As an example, the internal memory 508 is a small-low latency onChip SRAM memory.

Figure 3:
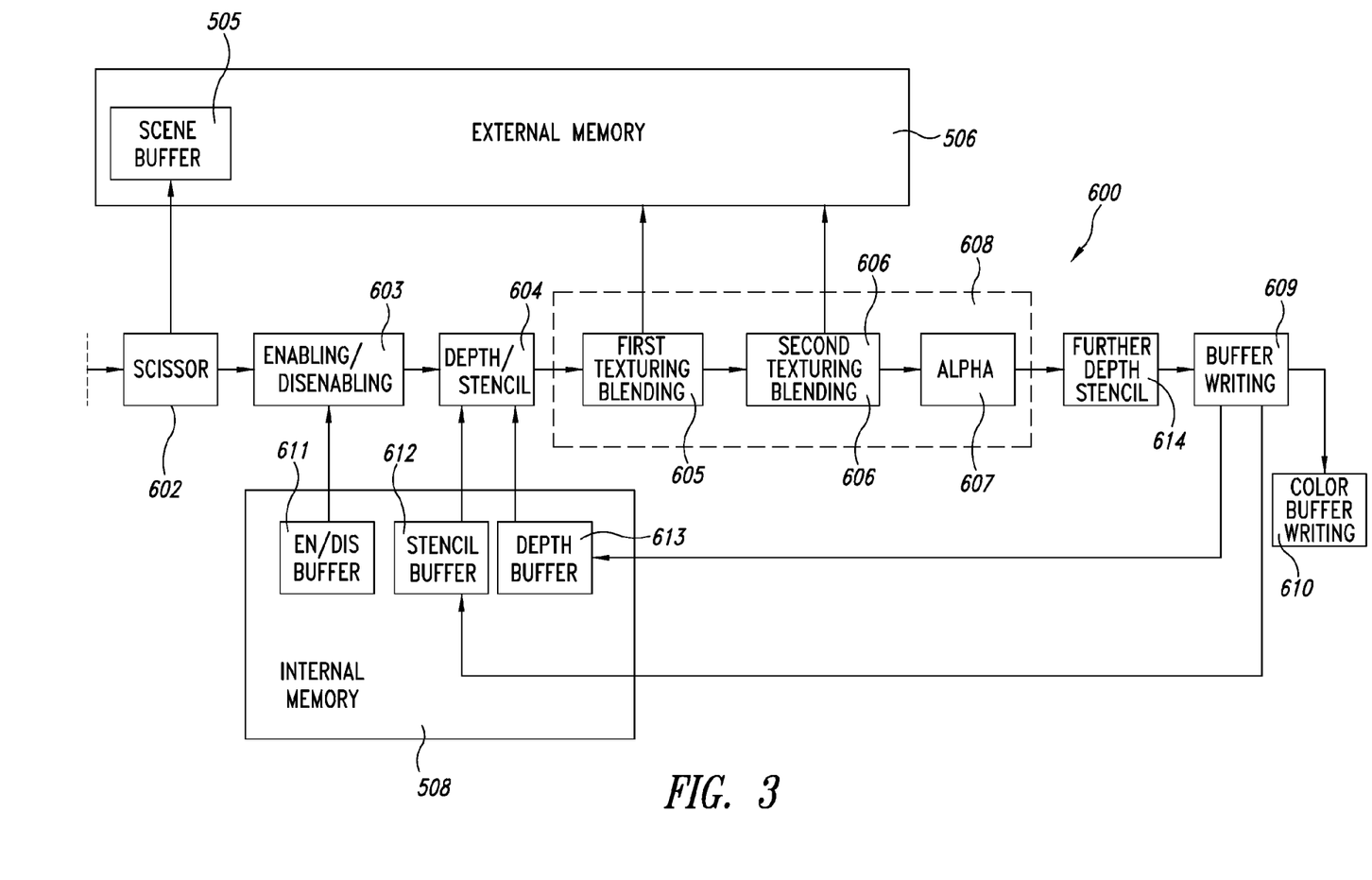
FIG. 3 shows an example of fragment graphic module in the accordance with a particular embodiment of the disclosure.

FIG. 3 is a block diagram of the fragment graphic module 600.

The fragment graphic module 600, also called fragment pipeline, is configured to perform processing of an incoming fragment F1 received from the rasterizer stage 507 to produce a color to be written into the display memory 70.

The fragment graphic module 600 comprises a scissor test stage 602, an enabling/disenabling stage 603, a depth/stencil test stage 604, a test stage 608, a buffer writing stage 609 and a color buffer writing stage 610.

The scissor test stage 602 is configured for checking if planar coordinates x1, y1 of the incoming fragment F1 received by the rasterizer stage 507 are such that the incoming fragment is included within an active portion of the screen in which a image will be rendered. As known by the skilled person of computer graphic, the active portion employable in the scissor test is defined by planar coordinates of the bottom-left corner and the upper-right corner preferably stored in the scene buffer 505. As an example, the active portion of the screen is a rectangle of the screen.

The scissor test stage 602 is normally used to delimit the active portion of the screen when the rendering of an image in that portion of the screen is required.

An incoming fragment that passes the scissor test is a fragment that is included in the active portion of the screen defined by planar coordinates of bottom-left corner and upper-right corner stored in the scene memory 505. An incoming fragment which does not pass the scissor test is discarded (i.e., killed) by the scissor test stage 602.

Typically, the scissor test stage 602 is configured as disenabled and the active portion of the screen is the entire screen itself.

In a particular embodiment, the scissor test stage 602 can be embedded within the rasterizer stage 507 in order to generate only fragments included in the active portion of the screen defined by planar coordinates of bottom-left corner and upper-right corner stored in the scene memory 505.

The depth/stencil test stage 604 is configured to perform a depth test on the incoming fragment F1.

Particularly, the depth/stencil test stage 604 is configured for comparing a current depth coordinate Z0 stored in a depth buffer 613 coupled to the depth/stencil test stage 604 with a depth coordinate Z1 of the incoming fragment F1 and defining a resulting fragment. Preferably, the depth buffer 613 is allocated into the internal memory 508 of the graphic module 600 of FIG. 2.

In the case where the resulting fragment is a previous fragment F0, the depth/stencil test stage 604 is configured to kill the incoming fragment F1 since it has not passed the depth test (fragment labeled as "not visible"). In the case that the resulting fragment is the incoming fragment F1, the depth/stencil test stage 604 is configured to label the incoming fragment as "visible" and to forward it down the fragment pipeline graphic module 600.

With "current" depth coordinate Z0 is defined the last depth coordinate stored in the depth test buffer 613 relating to a previously fragment F0, which results as "visible."

The depth/stencil test stage 604 is further configured to perform a stencil test on the incoming fragment F1.

Particularly, the depth/stencil test stage 604 is configured to compare planar coordinates X1, Y1 of the incoming fragment F1 with a set of test planar coordinates read from a stencil test buffer 612 allocated into the internal memory 508. The set of test planar coordinates stored in the stencil test buffer 612 defines an active area of the screen having a particular shape (e.g., a star) in which an image will be rendered. In other words, the stencil test stage 602 is configured to test if the incoming fragment F1 is included in the area of the screen defined by and stored in the stencil test buffer 612.

The depth/stencil stage 604 is configured to kill a fragment that does not pass the stencil or the depth test and to forward down the fragment pipeline graphic module 600 a fragment that does pass the stencil and/or the depth test.

The test stage 608 includes a first texture/blending stage 605 coupled to the depth/stencil test stage 604 for applying a first color attribute C1 to the incoming fragment F1. The test stage 608 further includes a second texturing/blending stage 606 coupled to the first texturing/blending stage 605 for applying to the incoming fragment F1 a second color attribute C2 for combining it with the first color attribute C1.

As defined by the OpenGL ES standard, the number of texturing/blending stages provided in a fragment graphic module 600 has a minimum value of two and maximum value of N, typically up to eight. A number of texturing/blending stages greater than two implies costs with reference to the level of the employed memory band and to the workload of the graphic engine. According to the particular embodiment illustrated in FIG. 3, the fragment graphic module 600 includes the minimum number of texture/blend stages (two) for compliance with the OpenGL ES standard.

The texturing/blending operations performed by the first 605 and second 606 texturing/blending stage comprise a first operation of reading a texture image mapped from the texture coordinates of the incoming fragment F1 in an external memory (as the scene memory 505) coupled to the texturing/blending stages in which a set of reference texture images are stored. Following, the first 605 and second 606 texturing/blending stages are configured to perform a second operation of coloring the incoming fragment F1 on the basis of colors coming from the mapped texture image.

In view of the first and second operations required, the processing of a fragment by the first 605 and second 606 texturing/blending stage is considered expensive.

The test stage 608 further comprises an alpha test stage 607 coupled to the second texture/blend stage 606 to process the incoming fragment F1 processed by the first 605 and second 606 texturing/blending stage. As known by the skilled person, the alpha test operation performed by the alpha test stage 607 is another binary filter operation to be overcome by a fragment processed in the fragment graphic module and particularly refers to the level of transparency of a fragment.

The alpha test stage 607 is configured to compare a transparency level value T1 of the incoming fragment F1 and a reference transparency level value T0 defined by the OpenGL ES standard as acceptable for the fragment graphic pipeline. The alpha test stage 607 is configured to forward down the fragment pipeline a fragment which overcomes the alpha test and to kill a fragment that does not pass the alpha test.

As it will be described in the following with reference to the enabling/disenabling stage 603, the test stage 608 (first texturing/blending test stage 605, second texturing/blending stage 606, and alpha test stage 607) can be also defined as a critical area.

The buffer writing stage 609 is coupled to the alpha test stage 607 to receive the incoming fragment F1 that overcomes the alpha test.

The buffer writing stage 609 is configured to update the depth test buffer 613 by replacing the current depth value Z0 with the depth coordinate Z1 of the incoming fragment F1 that has also overcome the alpha test and will be visible on the screen.

Furthermore, the buffer writing stage 609 is configured to update the stencil test buffer 612.

The position of the depth test stage before the test stage 608 avoids, advantageously, performing the expensive texturing and blending operations on a "not visible" fragment. In fact, the fragment graphic module 600 is configured to kill a fragment "not visible" before forwarding it to the texturing/blending stages.

Fragment graphic pipelines of prior designs have the depth/stencil test stage located after the texturing/blending stages and alpha test stage. If the alpha test stage is disenabled, the fragment pipeline is arranged to kill a fragment as "not visible" only after the processing of the same fragment by texturing/blending stages.

Furthermore, the position of the buffer writing stage 609 after the alpha test stage 607 allows, advantageously, updating of the depth test buffer 613 with the depth coordinates of a fragment that has overcome, after the depth test, also the alpha test. In the following, the depth/stencil test stage 604 will process another incoming fragment by comparing the depth coordinates of an incoming fragment with a current depth value stored in the depth buffer 613 that corresponds to the last processed fragment that has overcome the depth and alpha tests. The depth test buffer 613 is not updated with a depth coordinate of a fragment which does not overcome the alpha test.

Furthermore, the solution of FIG. 3 is improved with reference to known fragment pipeline of the prior designs in which the depth/stencil test stage is configured to read from and write in the depth test buffer. In fact, in prior designs the depth/stencil stage is typically configured to perform both reading and updating the depth test buffer with the depth coordinate of the fragment that overcame the depth test. In the prior arrangement, a fragment that passes the depth test can be processed by the texturing/blending stages and the alpha test stage. When the fragment does not overcome the alpha test, processing by the depth test stage of a following fragment will be made with reference to an "inconsistent" current depth coordinate since it corresponds to a fragment that has passed the depth test but which was killed by the alpha test and, therefore, was labeled as "not visible."

As clearly explained above, the fragment graphic module 600 illustrated in FIG. 3 performs the depth test of following incoming fragments processed by the fragment graphic module with reference to the depth test buffer that has been updated with a current depth value corresponding to a fragment which has passed both the depth test and the alpha test.

In a fragment graphic pipeline in accordance with the OpenGL ES Standard of prior designs, the depth/stencil test stage is typically configured to read from and write in the depth test buffer.

The fragment graphic module 600 in accordance with FIG. 3 is advantageously configured for reading and writing the depth test buffer 613 in two different stages. In fact, the depth/stencil test stage 604, located before the first texture/blend stage 605, is configured to perform the depth test by only reading the depth buffer 613 while the buffer writing stage 609, located after the alpha test stage 607, is arranged for only updating the depth test buffer 613.

The color buffer write stage 610 is operatively associated with the buffer writing stage 609 and is configured to write the scene memory with the pixel information (fragment) which have been processed by the fragment graphic module 600.

The fragment graphic module 600 can include additional stages (e.g., blending stages) between the buffer writing stage 609 and the color buffer write stage 610 (not shown in FIG. 3).

The fragment graphic module 600 can further include a depth/stencil test stage 614 located between the alpha test stage 607 and the buffer writing stage 609 and configured to perform depth and stencil test of a fragment and to update depth and stencil test buffer.

The enabling/disenabling stage 603 is provided in order to improve the performance of the fragment graphic module 600 of the device in which a processing delay is introduced since the reading of the depth buffer 613 is performed before the writing of the depth buffer 613.

In a fragment graphic pipeline, as known by the skilled person, the processing delay is measured by the number of fragments processed by the fragment pipeline.

The fragment graphic module illustrated in FIG. 3 is configured for so-called parallel fragment processing. As an example, each stage of the fragment graphic module 600 is arranged to process simultaneously ten fragments: depth/stencil test stage 604 processes the fragment 1, first texturing/blending stage 605 processes the fragment 11, second texturing/blending stage 606 processes the fragment 21 and so on.

This fragment graphic module arrangement, so-called accelerated in hardware configuration, enables performing M different operations on M different fragments in parallel. Parallel processing is quicker than the so-called serial processing in which the fragment graphic pipeline is dedicated to process one fragment at a time.

Reference is now made to the case in which the incoming fragment F1 having planar coordinates X1, Y1 is received by the depth/stencil test stage 604 in a number of fragments so as a previous fragment F0 is under processing by the test stage 608 (to be in the critical area) and the depth test buffer 613 is not updated with the depth coordinate of the previous fragment F0.

In this scenario, the depth/stencil test stage 604 will compare the depth coordinate of incoming fragment F1 with a current depth coordinate that is not the depth coordinate of the previous fragment processed by the depth/stencil test stage having the same planar coordinates X1, Y1. In this case the depth/stencil test stage will carry out "dirty" reads of the depth test buffer 613.

The depth test made on a inconsistent current depth value (dirty reads) is due to the delay introduced between the reading operation of the depth test buffer 613 (before first texturing/blending operation) and the writing/updating of the depth test buffer 613 (after the alpha test stage 607).

The scenario described above is related only the case in which the incoming fragment and the previous fragment have the same planar X, Y coordinates and, therefore, the test of the respective depth coordinate results is important in order to establish the fragment to be visible on the screen.

It should be observed that there are very low chances that processed fragments present the same planar X, Y coordinates (typically in 1% of the cases).

In any case, the fragment graphic module 600 illustrated in FIG. 3 is arranged to solve the side effect described above by means of the enabling/disenabling stage 603 and the further depth/stencil stage 614.

The enabling/disenabling stage 603 can be also called a "hazard detection" stage and includes a respective enabling/disenabling buffer 611 preferably embedded in the enabling/disenabling stage 603 for storing a track indicative of whether the previous fragment F0 is under processing by the test stage 608 or if the processing of the previous fragment F0 by the test stage 608 is terminated. Particularly, the above mentioned track of a fragment has planar X, Y coordinates of the fragment. In an alternative embodiment, the enabling/disenabling buffer 611 can be allocated in the internal memory 508.

The enabling/disenabling stage 603 is arranged for checking if a new incoming fragment to be processed has the same position coordinates of a previous fragment processed by the enabling/disenabling stage 603 which has not reached the buffer writing stage 609 (depth test buffer 613 not update with a "consistent" depth coordinate) since they are under processing by the test stage 208.

In order to avoid performing the depth test on an incoming fragment with a "no consistent" current depth coordinate stored in the depth test buffer 613, in case a hazard is detected (incoming fragment having the same position coordinates of a previously fragment present in the critical area, not yet processed by buffer writing module 609), the enabling/disenabling stage 603 is configured to mark the incoming fragment as "hazardous" with a flag, which means "first depth/stencil test not carry out on this fragment." Therefore, the enabling/disenabling stage 603 is configured for enabling the further depth test stage 614 and disabling the depth test stage 604 when the previous fragment F0 has the planar coordinates of the incoming fragment F1 under processing by the test stage 608.

Furthermore, the enabling/disabling stage 603 is arranged for enabling the depth test stage 604 and disabling the further depth test stage 614 when the test stage 608 has terminated the processing of a previous fragment F0 (i.e., no hazard detected).

The "hazard" flag is included in the set of pixel information represented by a fragment.

The further depth/stencil test stage is analogous to the depth/stencil test stage 604 and is configured to compare the depth coordinate of the fragment labeled as "hazardous" with a "consistent" current depth buffer. In fact, by delaying the depth test on the incoming fragment after the alpha test stage 608, it allows for the buffer writing stage 609 to update the depth buffer stage 613 with the "consistent" depth coordinate of the fragment having the same X, Y position coordinates which, in the mean time, has left the critical area 208.

In an incoming fragment labeled as "hazardous" (1% of the cases) the depth/stencil test is postponed to a further depth/stencil test stage located after the alpha test stage 607 so that the buffer writing stage 609 has the time for updating the depth buffer 613 with the "consistent" depth coordinate of the fragment coming out from the critical area 208.

Figure 4:
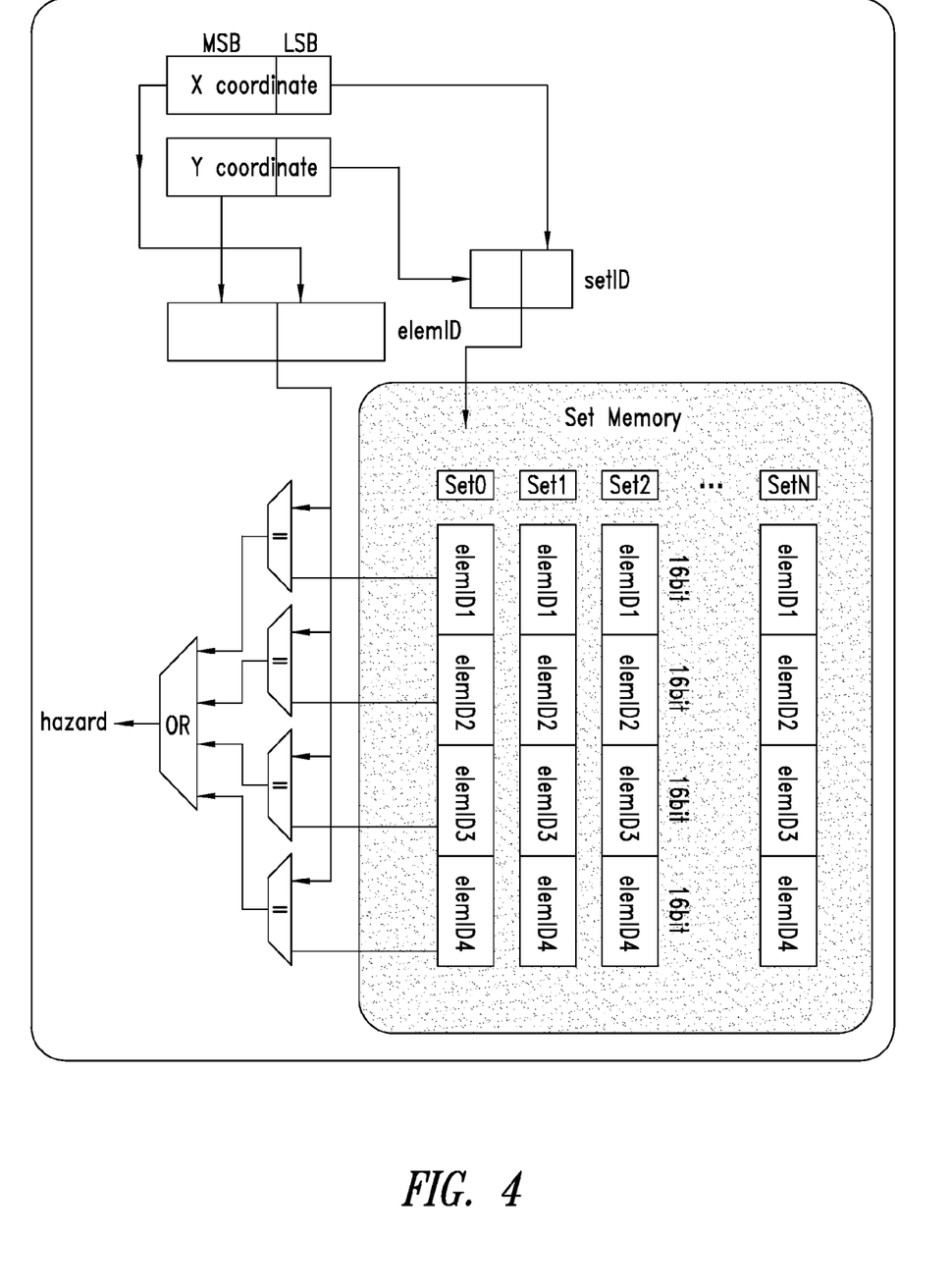
FIG. 4 shows schematically an example of organization of a memory embedded in an operative stage of the fragment graphic module of FIG. 3.

With reference to FIG. 4, an example of organization of the memory embedded in the respective "hazard" buffer and a mechanism for searching planar X, Y coordinates within said buffer will be described.

The "hazard" buffer illustrated in FIG. 4 is configured to allow a search of a parallel type by an algorithm having a reduced number of steps (e.g., four steps).

Inputs of the algorithm are planar coordinates (X coordinate, Y coordinate) of an incoming fragment. In the following example, each coordinate is n bits wide (e.g., n=16). However, it is to be understood that the width of the coordinates may be shorter or longer. Each set is able to trace up to M different fragments (e.g., M=4). Hence, a maximum of 16 bits is necessary to trace a single fragment. So, in this embodiment every single set has a size of 64 bit.

The four steps of the hazard detection algorithm are:

step A): A setID value is computed starting from the Nx and Ny LSB bits from both (X, Y) planar coordinates. So, this setID value is (Nx+Ny) bits wide (thus, it is possible to directly address $2^{(Nx+Ny)}$ different sets;

step B): an elemID value is computed putting together the remaining (n-Nx) and (n-Ny) MSB bits from both (X, Y) planar coordinates. The variable elemID is, at a maximum, 16 bits wide;

step C): reading from the buffer the 64 bits of the set whose ID is setID;

step D): checking to determine (using 4 parallel searches) if the computed elemID value is already stored inside the read set, and if so, the hazard is detected.

Figure 5:
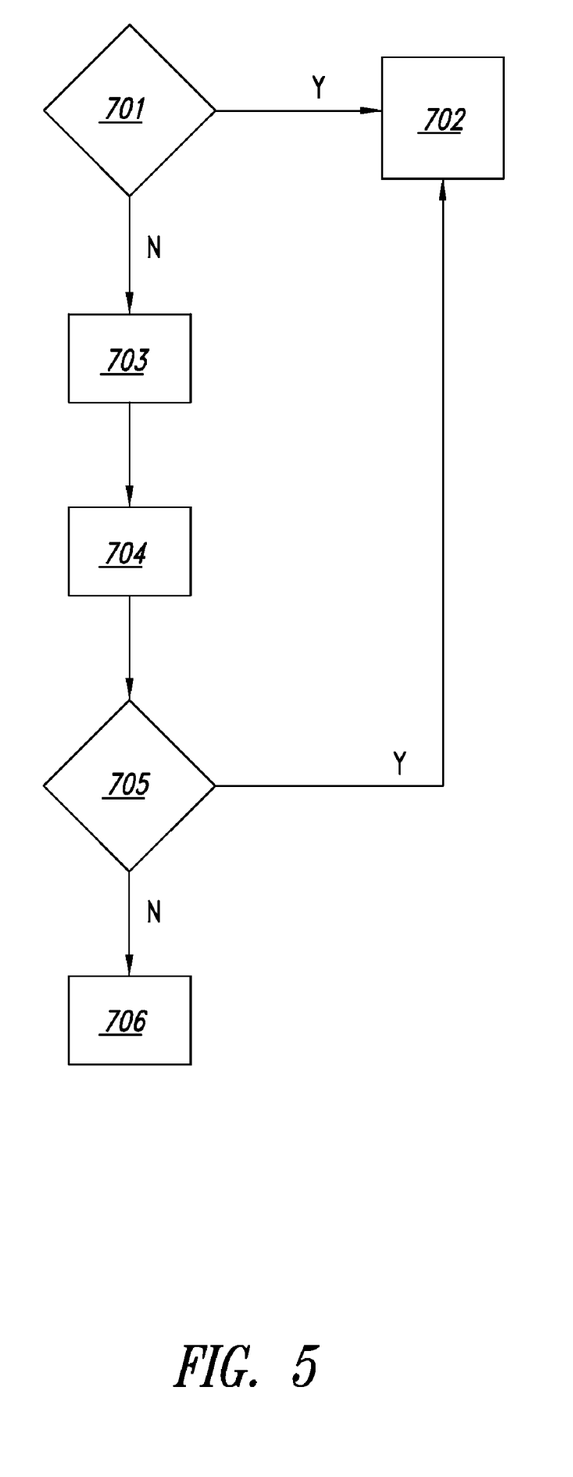
FIGS. 5 and 6 show functional block diagrams illustrating examples of operation of particular stages of the fragment graphic module of FIG. 3.

In FIG. 5 is illustrated an example of a flow diagram 700 of a functional block process by the depth/stencil test stage 604 on an incoming fragment F1 received from the enabling/disenabling stage 603.

The flow diagram 700 has a first checking block 701 for controlling the status of the "hazard" flag of the incoming fragment.

If the fragment is marked as "hazardous" (Y), the depth/stencil test stage 604 does not process the incoming fragment (depth test stage 604 disenabled and further depth test stage 614 enabled). The incoming fragment F1 is passed directly to the next stage of the fragment graphic module (block 702).

If the fragment is marked as "not hazardous" (N), the depth/stencil test stage 604 processes the incoming fragment F1 (depth/test stage 604 enabled and further depth test stage 614 disenabled) (block 703) and the stencil buffer is updated (block 704).

The diagram flow 700 further comprises a second checking block 705 for controlling if the incoming fragment has to be passed to the next stage of the fragment graphic module or has to be killed, as explained in the following.

If the incoming fragment overcome the depth test or the stencil buffer is updated, the incoming fragment (marked as "not hazardous") (Y) is forwarded to the next stage of the fragment graphic module 600 (block 702).

If the incoming fragment does not overcome the depth test and the stencil buffer is not updated (N), the incoming fragment is killed (block 706).

Figure 6:
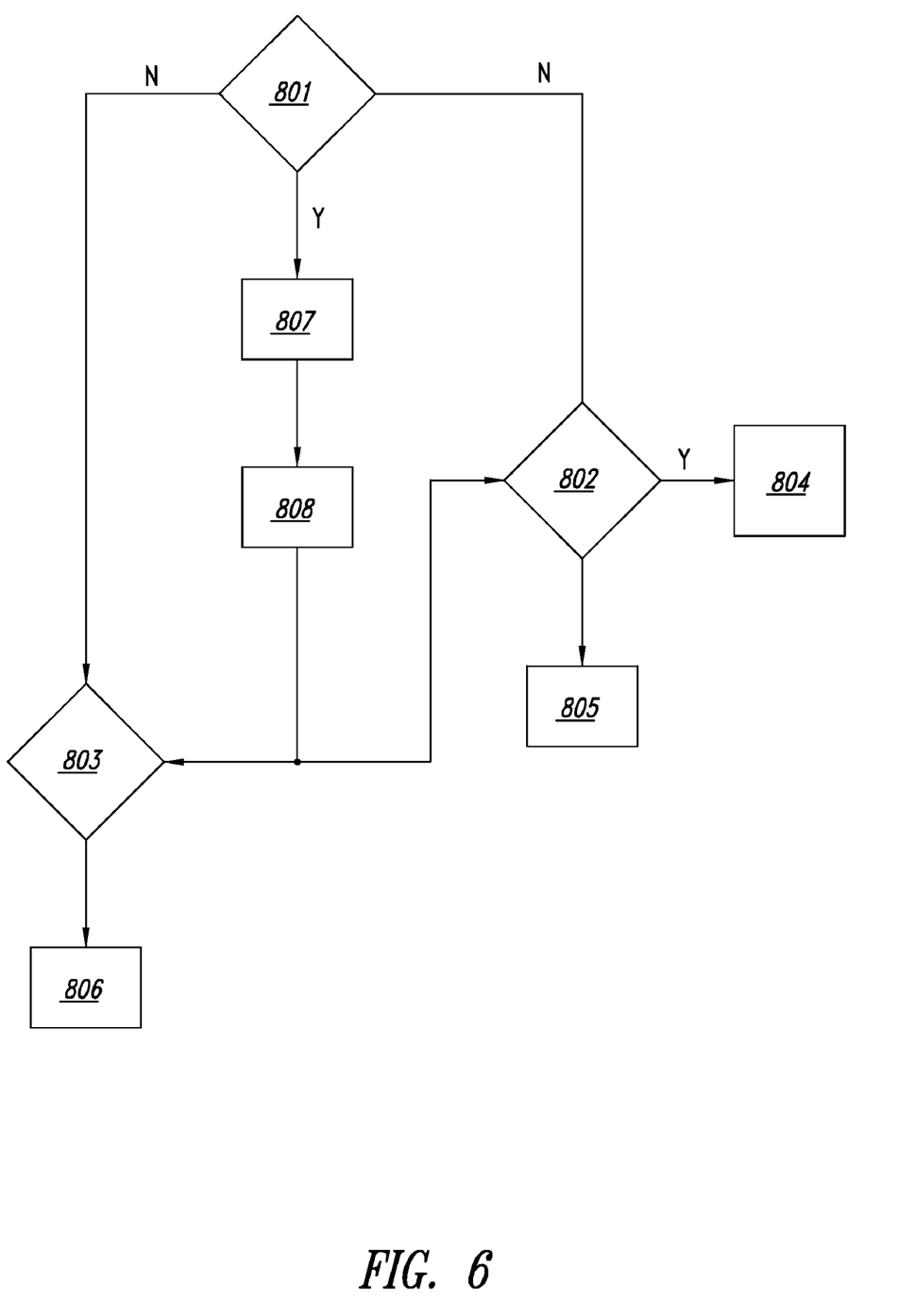

FIG. 6 shows an example of a flow diagram 800 of a functional block process by the buffer writing stage 609 on the incoming fragment F1 processed by the enabling/disenabling stage 603.

The flow diagram 800 includes a first checking block 801 for controlling the status of the "hazard" flag of the incoming fragment.

If the incoming fragment is marked as "not hazardous" (N), the incoming fragment is passed to a second checking block 802 to verify if the incoming fragment has passed the depth test and to a third checking block 803 to verify if an updating of the depth buffer is needed.

With reference to the second checking block 802, if the incoming fragment has passed the depth test (Y), it passes to the next stages of the fragment graphic module (block 804). If the incoming fragment has not passed the depth test (Y), the fragment is killed (block 805).

With reference to the third checking block 803, if an updating of the depth buffer is needed, the buffer writing stage is enabled to write the depth buffer (block 806).

With reference to the first checking block 801, if the incoming fragment is marked as "hazardous" (Y), the incoming fragment is processed by the further depth/stencil test stage for performing depth test (block 807) and for updating the stencil buffer (block 808). The incoming fragment processed by further depth/stencil test stage is then forwarded to the second check block 802 and the third check block 803. The processing of the incoming fragment then continues as described above.

Figure 7:
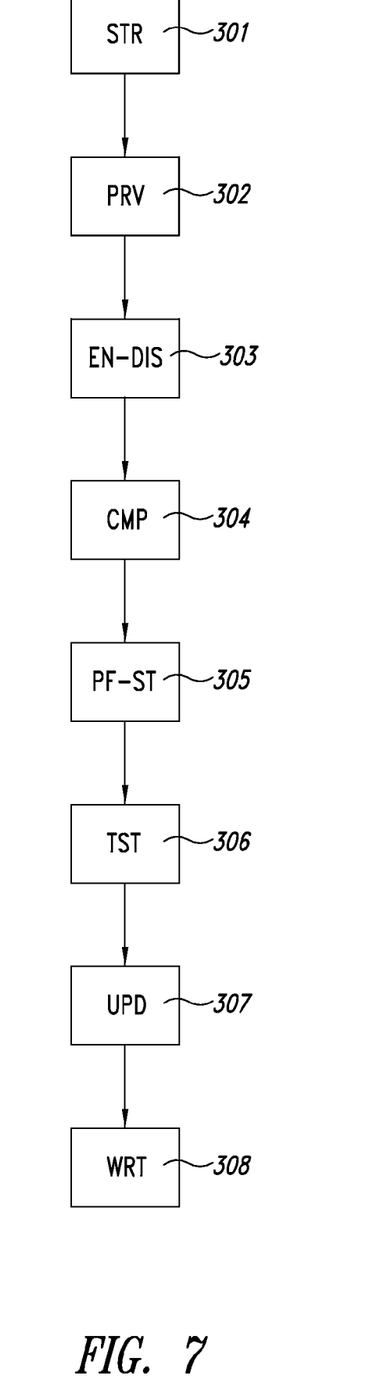
FIG. 7 shows a flow chart illustrating an example of graphic rendering method.

With reference to the flow chart of FIG. 7, an example of fragment graphic rendering method 900 (in the following simply method 900) corresponding to the operation of the fragment graphic module of FIG. 3 will now be described.

The method 900 includes a step of storing STR (901), by means of the buffer writing stage 609, a current depth coordinate value Z0 in the depth test buffer 613 corresponding to the last fragment F0 processed by the fragment graphic module 600 and which results as "visible." The method 900 further includes a step of providing PRV (902) an incoming fragment F1 generated by the rasterizer stage (507) of the graphic engine 500.

The method 900 continues with a step of enabling/disenabling EN-DIS (903) for comparing planar coordinates of the incoming fragment with the set of position coordinates stored in the enabling/disenabling buffer 611. It should be observed that in this example of operation, as in 99% of the cases, a hazard was not detected, and therefore the incoming fragment is labeled as "not hazardous."

The incoming fragment F1 is received by the depth/stencil test stage 604 in which is performed the step of comparing CMP (904) the current depth coordinate Z0 stored in the depth buffer 613 with a depth coordinate Z1 of the incoming fragment and defining a resulting fragment. It is now supposed that the incoming fragment is more visible than the last fragment processed as "visible" F0.

The method 900 further includes the step of performing PF-ST (905) a stencil test on the incoming fragment F1 and the step of testing TST (906) the incoming fragment F1 to define a retained fragment. Particularly, the step of testing (905) involves the step of performing on the incoming fragment F1 a first texture operation, the step of performing a second texture operation, and the step of performing the alpha test in which the processed incoming fragment F1 is processed by the alpha test 607 to define the retained fragment (fragment F1).

Subsequently, the method 900 moves to the step of updating UPD (907), by means of the buffer writing stage 609, the depth buffer 613 with the depth coordinate Z1 of the retained fragment F1.

This is followed by the step of writing WRT (908) the color buffer of the scene memory 505, by means of the color buffer writing stage 610, with the color pixel information included in the set of pixel information represented by the retained fragment F1.

As is clear from the description of the above examples and embodiments, the teachings of the disclosure are applicable to any type of graphic systems, although they show particular advantages for "embedded" applications such as graphic applications to be run on systems having limited computing power and memory capacity.

It is important to note that the described solution has passed all the 1.1 OpenGL ES standard conformance tests. Furthermore, a series of simulations of the operation of the fragment graphic module described herein and of a fragment pipeline of prior designs have been conducted in order to have an estimation in terms of Texture Unit Band-Width reduction using a real game as reference. As a result, a Texture Unit Band-Width reduction that is comparable to the percentage of fragments killed by the depth test has been observed.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet, are incorporated herein by reference, in their entirety. Aspects of the embodiments can be modified, if necessary, to employ concepts of the various patents, applications and publications to provide yet further embodiments.

These and others changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fragment graphic module comprising:
a depth test buffer structured to store a current depth value;
a depth test stage coupled to the depth test buffer to compare the current depth value with a depth coordinate associated with an incoming fragment and define a resulting fragment;
a test stage to test the resulting fragment and generate a retained fragment from the resulting fragment that passes the test;
a further depth test stage coupled to the test stage and structured to test the retained fragment received from the test stage and to update the depth test buffer;
an enabling/disabling stage placed before the depth test stage and adapted to enable the further depth test stage and disable the depth test stage when a previous fragment having planar coordinates of the incoming fragment is under processing by the test stage; the enabling/disabling module structured to enable the depth test stage and to disable the further depth test stage when the test stage has terminated the processing of a previous fragment; and
a buffer writing stage operatively associated with the test stage to receive the retained fragment, the buffer writing stage coupled to the depth test buffer and adapted to update the current depth value with a depth value of the retained fragment.

2. The fragment graphic module of claim 1, further comprising a second buffer writing stage arranged between the test stage and the depth test buffer and adapted to update the current depth value.

3. The fragment graphic module of claim 2, wherein the test stage comprises a first texturing/blending stage coupled to a scene buffer allocated in an external memory and configured to apply to the resulting fragment a first color attribute taken from a texturing image stored in the external memory.

4. The fragment graphic module of claim 3, wherein the test stage comprises a second texturing/blending stage coupled to the scene buffer and configured to apply to the resulting fragment a second color attribute for combining it with the first color attribute, the second color attribute taken from a further texturing image stored in the external memory.

5. The fragment graphic module of claim 4, wherein the test stage further comprises an alpha test stage to apply an alpha test to the resulting fragment processed by the first and second texturing/blending stages and define the retained fragment.

6. The fragment graphic module of claim 1, comprising a stencil test stage coupled to a stencil buffer and adapted to apply to the resulting fragment a stencil test by comparing planar coordinates of the resulting fragment with a set of planar coordinates stored in the stencil test buffer to define an active area to be rendered.

7. The fragment graphic module of claim 6, wherein the buffer writing stage is also coupled to the stencil test buffer and is configured to update the set of planar coordinates.

8. The fragment graphic module of claim 7, wherein the stencil test stage is included in the depth test stage.

9. The fragment graphic module of claim 1, wherein the enabling/disabling stage is operatively associated with a relative enabling/disenabling buffer and is adapted to store a track indicative of whether the previous fragment is under processing by the test stage or if the processing of the previous fragment by the test stage is terminated.

10. The fragment graphic module of claim 1, comprising a color writing buffer placed after the buffer writing stage and configured to write in a scene memory coupled to the fragment graphic pipeline pixel information included in the retained fragment processed by the fragment graphic module.

11. The fragment graphic module of claim 1, wherein the depth test buffer, said stencil test buffer and said enabling/disenabling stage are allocated in an internal memory.

12. The fragment graphic module of claim 9, wherein the enabling/disenabling buffer is embedded in the enabling/disenabling stage.

13. A method for rendering an image on a screen of a display unit of a graphic system having a graphic module coupled to and controlled by a central processing unit, comprising:
    storing a current depth value associated with a current fragment in a depth test buffer;
    performing a depth test by comparing the current depth value with a depth value associated to an incoming fragment and defining a resulting fragment;
    testing the resulting fragment to define a retained fragment;
    enabling a further depth test and disabling the depth test when testing on a previous fragment having planar coordinates of the incoming fragment is under processing; and
    updating the current depth value with a depth value of the retained fragment.

14. The method of claim 13, wherein testing the resulting fragment comprises:
    performing on the resulting fragment a first texturing/blending operation;
    performing on the resulting fragment a second texturing/blending operation;
    performing on the resulting fragment an alpha test for defining a retained fragment.

15. The method of claim 13, comprising:
    enabling the depth test and disabling the further depth test when testing of the previous fragment is terminated.

16. A fragment graphic pipeline for processing incoming fragments having attributes associated with pixels of an image to be rendered on a display screen, the pipeline comprising:
    a depth/stencil test stage adapted to compare a depth value of the incoming fragment with a depth value stored in a depth test buffer, the depth/stencil test stage structured to further compare planar coordinates in the incoming fragment with test planar coordinates stored in a stencil buffer that define the active area on the display screen to determine if the incoming fragment is included in the active area of the display screen;
    at least a first texturing/blending stage and a last texturing/blending stage coupled to the depth/stencil stage and structured to apply color attributes to the incoming fragment;
    an alpha test stage coupled to the last texturing/blending stage and structured to compare a transparency level of the incoming fragment and a reference transparency and to forward down the pipeline the incoming fragment that passes the alpha test stage comparison of the transparency level; and
    a buffer writing stage coupled to the alpha test stage to receive the incoming fragment that passes the alpha test stage and structured to update the depth test buffer to replace the current depth value with a depth value of the incoming fragment that passes the alpha test stage, the buffer write stage operatively associated with a color buffer that is structured to generate pixel information from the incoming fragment that has been processed through the pipeline; and
    an additional depth/stencil test stage coupled between the alpha test stage and the buffer writing stage and structured to perform depth and stencil testing of the incoming fragment and to update the depth test buffer and the stencil test buffer.

17. The pipeline of claim 16, comprising an enabling/disabling stage coupled to an input of the depth/stencil test stage and structured to introduce a processing delay to provide time for reading of the depth test buffer by the depth/stencil test stage before writing to the depth test buffer by the buffer writing stage.

18. The pipeline of claim 16, wherein each of the depth/stencil test stage, at least first and last texturing/blending stages, the alpha test stage, and the buffer writing stage are structured to parallel process incoming fragments simultaneously.

19. A fragment graphic pipeline for processing incoming fragments having attributes associated with pixels of an image to be rendered on a display screen, the pipeline comprising:
    a depth/stencil test stage structured to compare a depth value of the incoming fragment with a depth value stored in a depth test buffer, the depth/stencil test stage structured to further compare planar coordinates in the incoming fragment with test planar coordinates stored in a stencil buffer that define the active area on the display screen to determine if the incoming fragment is included in the active area of the display screen;
    at least a first texturing/blending stage and a last texturing/blending stage coupled to the depth/stencil stage and structured to apply color attributes to the incoming fragment;

an alpha test stage coupled to the last texturing/blending stage and structured to compare a transparency level of the incoming fragment and a reference transparency and to forward down the pipeline the incoming fragment that passes the alpha test stage comparison of the transparency level;

a buffer writing stage coupled to the alpha test stage to receive the incoming fragment that passes the alpha test stage and structured to update the depth test buffer to replace the current depth value with a depth value of the incoming fragment that passes the alpha test stage; and an enabling/disabling stage coupled to an input of the depth/stencil test stage and structured to introduce a processing delay to provide time for reading of the depth test buffer by the depth/stencil test stage before writing to the depth test buffer by the buffer writing stage.

20. The pipeline of claim 19, wherein the scissor test stage is structured to generate only incoming fragments that are included in the active portion of the display screen, the active portion defined by planar coordinates of a bottom-left corner and an upper-right corner of the active area.

21. The pipeline of claim 19, wherein each of the depth/stencil test stage, at least first and last texturing/blending stages, the alpha test stage, and the buffer writing stage are structured to parallel process incoming fragments simultaneously.

* * * * *